Aug. 5, 1952     H. S. SIZER     2,606,033
MACHINE TOOL FEED FINGER
Filed Oct. 23, 1946
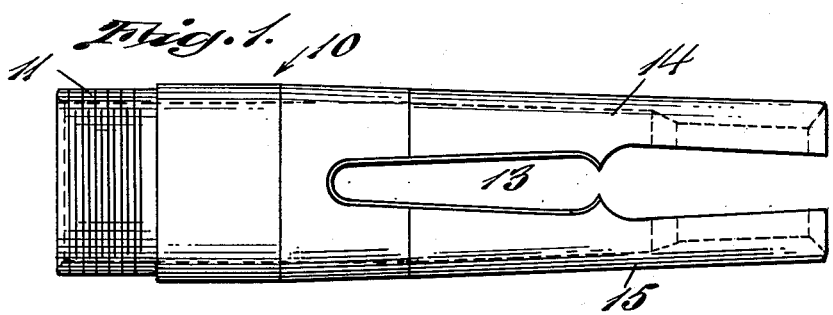
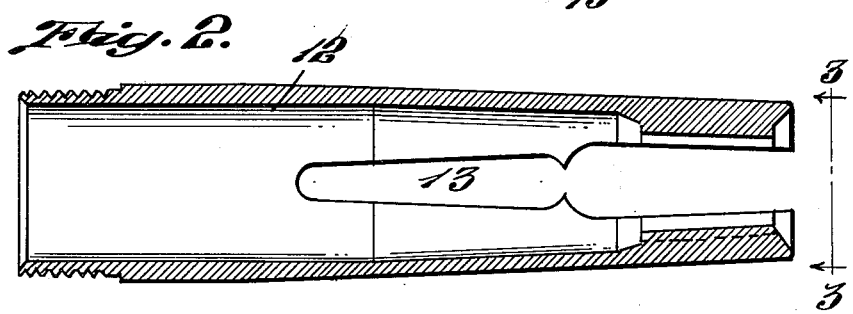
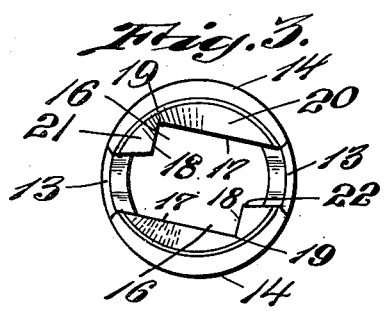
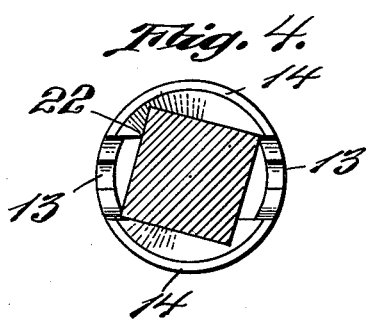
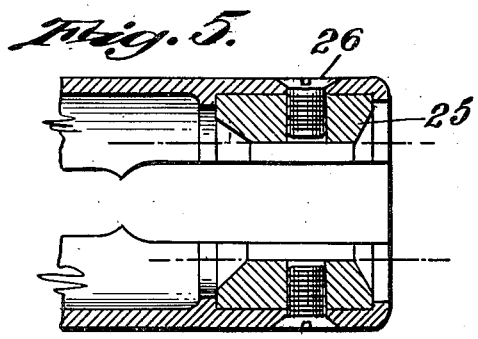
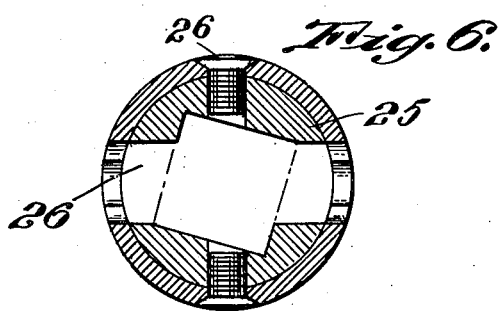
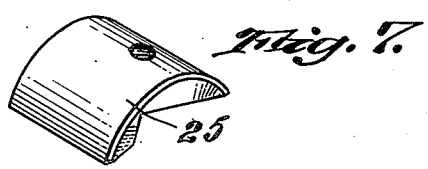
INVENTOR.
Harold S. Sizer
BY
Barlow & Barlow
ATTORNEYS.

Patented Aug. 5, 1952

2,606,033

UNITED STATES PATENT OFFICE 2,606,033

MACHINE-TOOL FEED FINGER

Harold S. Sizer, Rumford, R. I., assignor to Brown & Sharpe Manufacturing Company, a corporation of Rhode Island Application October 23, 1946, Serial No. 705,053

6 Claims. (Cl. 279—46)

This invention relates to a machine tool feed finger such for instance as that used in feeding rectangular stock in a screw machine.

In the feeding of rectangular stock to operating tools it is usual to use a tubular member which is slotted to provide jaws to grip the stock for moving it forward. Stock of a rectangular shape usually is gripped by jaws having a V-shape notch in each of the jaws with the apex of the V located centrally of the jaws so that there are legs of equal length on either side of the apex of the V. The usual finger has spring-tempered jaws which are close together or are touching when the stock is not in place. With the stock in position, the jaws are forced apart to develop the feeding force or grip. While if the stock is suddenly removed, the jaws, which have a tendency to spring together and to over travel their rest position, will collide with a serious impact. This impact oftentimes causes cracks at the apex of the V between the legs of either or both jaws. Such a feed finger has always been made substantially symmetrical in cross section. Very frequently the jaws of the feed finger become somewhat out of line and their corners will tend to dig into and mar up a piece of work which is to pass through them.

One of the objects of this invention is to provide a feed finger for rectangular stock so that the jaws cannot snap together or touch each other when the work is withdrawn from between them.

Another object of this invention is to provide a feed finger for rectangular stock with the jaws stronger than when these jaws are of symmetrical cross section as heretofore usually provided.

Another object of this invention is to provide the jaws of a feed finger so that should the jaws be somewhat out of line there would be less tendency for the corners of the jaws to dig into the stock and mar the surface thereof.

With these and other objects in view, the invention consists of certain novel features of construction as will be more fully described and particularly pointed out in the appended claims.

In the accompanying drawings:

Fig. 1 is a plan view of the machine tool feed finger formed in accordance with this invention;

Fig. 2 is a sectional view through substantially the center of the showing in Fig. 1;

Fig. 3 is an end view on line 3—3 of Fig. 2;

Fig. 4 is a similar view to Fig. 3 but showing a bar of square stock as gripped by the jaws of the feed finger.

Fig. 5 is a fragmental sectional view of a modified form of the invention.

Fig. 6 is a sectional view illustrating a separable pad as being provided in each of the jaws for the reception of the stock as distinguished from the jaws being all one piece with the feed finger.

Fig. 7 is a perspective view of one of the pads of Fig. 5 or 6.

In proceeding with this invention I have modified the usual feed finger by providing larger slots between the jaws. These slots being of a sufficient width so that jaws cannot snap together with a sharp impact when work is removed from between the jaws. Further, the V-shape notch which is usually provided in each of the jaws for the reception of a corner of the rectangular work in this case is offset from the center of the jaw so as to provide a long leg and a short leg and I find that by this arrangement a much stronger jaw is provided and also one in which the corners are such that they will not dig into or mar the work to so great an extent as previously should the jaw become twisted or warped due to heat treatment.

With reference to the drawings 10 designates generally a one-piece tube threaded as at 11 for attachment in the machine tool in which it operates. The tube is hollow as indicated at 12 throughout its length and is slotted as at 13 by means of two slots in the present instance to provide two jaws 14 on opposite sides of a diametrical line through the center of the two slots. The jaws 14 are of resilient spring stock and are set toward each other and heat treated so that when a bar of stock of a size larger than the opening between them is passed into these jaws, the jaws will be sprung apart and by the inherent resilience the jaws will grip the stock so as to feed the same forward.

The slot 13 is of a width so that when the stock is removed from between the jaws, these jaws cannot spring toward each other so as to snap together or contact to give a sharp impact which may tend to fracture or crack the metal at the sharp corner formed in either jaw.

This feed finger is designed for feeding rectangular stock more particularly square stock. Each of the jaws 14 on its inner surface is notched as at 16 with the apex of the two angularly related walls 17 and 18 shown as at 19 offset from the center line between the jaws, thus providing a long leg 20 and a short leg 21 for each of the jaws 14. This arrangement of a short leg and a long leg is found to provide a stronger jaw than where the notch or apex 19 is located midway of the jaw. There is a smaller turning movement by reason of the short leg and I have found that it has less tendency to open or split at the corner 19. I have also found that the corner 22 has less tendency to mar the stock should either of the jaws become twisted or distorted from the true line of position. This result occurs because the long face 17 will better align with the surface of the work while leaving the pressure on the corner 22 more nearly in line with its direction of action than were this angle made by the surface extending to the center point of the jaw.

In some cases instead of the jaw being all one piece a pad 25 may be formed and attached to an inner cylindrical surface by a screw 26 so that these parts may be interchanged. In this case however, the same angular formations will exist in the pad as were previously described in the jaw formed of one piece and thus the same action on the stock will occur.

I claim:

1. A screw machine feed finger for rectangular stock comprising a hollow body member slotted across its diameter to provide a plurality of spaced jaws, each jaw having two angularly related faces and positioned relative to the slot so that each jaw has a long and a short leg.

2. A screw machine feed finger for rectangular stock comprising a hollow body member slotted across its diameter to provide a plurality of spaced jaws wherein each jaw has legs to extend toward each other from the slots between the jaws to a V shape juncture to engage the rectangular stock, one of the said legs being appreciably longer than the other whereby an unsymmetrical formation of jaw is provided.

3. A screw machine feed finger for rectangular stock comprising a hollow body member slotted across its diameter to provide a plurality of spaced portions, separable pads carried by said portions to form jaws made up of a long and a short leg presenting surfaces to engage the stock to be fed.

4. A screw machine feed finger as set forth in claim 1 wherein the slot is of a width wider than the distance the jaws move toward each other when the stock is withdrawn to prevent any sharp impact of the jaws when stock is removed from the finger.

5. A screw machine feed finger as set forth in claim 3 wherein the slot is of a width wider than the distance the jaws move toward each other when the stock is withdrawn to prevent any sharp impact of the pads when stock is removed from the finger.

6. A screw machine feed finger for polygonal stock with an even number of sides comprising a hollow body member slotted across its diameter to provide a plurality of spaced jaws, said jaws each having two angular faces gripping diametrically opposite corners of the stock and said faces being located on each jaw relative to the slot so that each jaw has a long and a short leg.

HAROLD S. SIZER.

REFERENCES CITED

The following references are of record in the file of this patent:

UNITED STATES PATENTS

| Number | Name | Date |
|---|---|---|
| 1,502,116 | O'Connell | July 22, 1924 |
| 1,608,627 | Sheffer | Nov. 30, 1926 |
| 1,908,000 | Sheffer | May 9, 1933 |